Dec. 6, 1955  H. E. KARIG  2,725,841
TORPEDO STEERING CONTROL
Filed Oct. 8, 1948
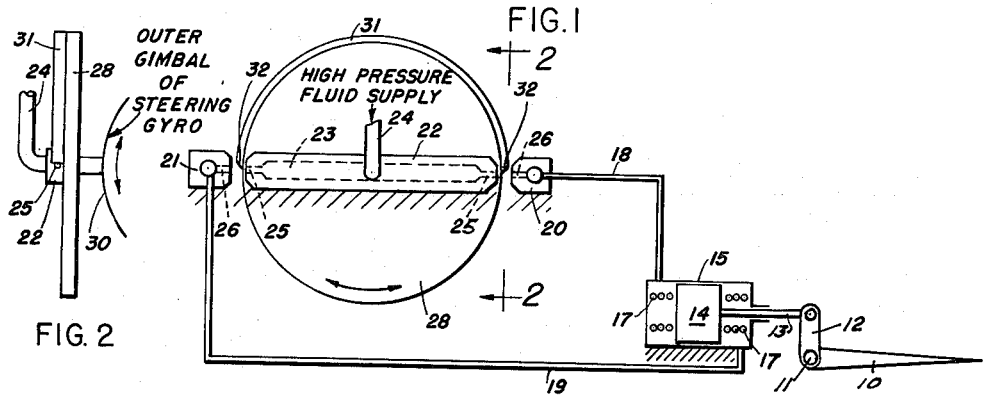
FIG. 1
FIG. 2
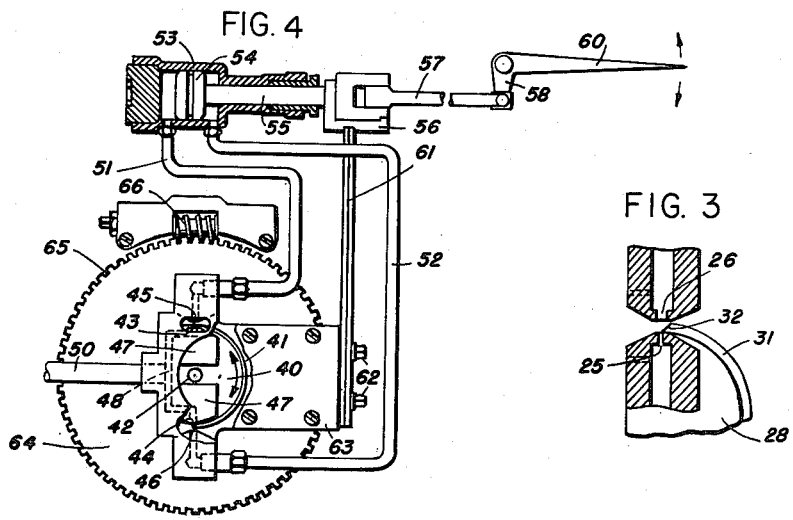
FIG. 4
FIG. 3
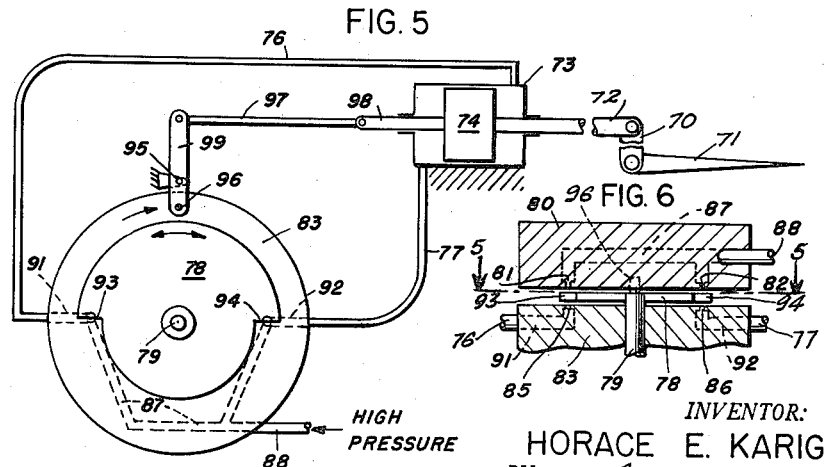
FIG. 5
FIG. 6
INVENTOR:
HORACE E. KARIG
BY
ATT'Y

United States Patent Office 2,725,841
Patented Dec. 6, 1955

2,725,841

TORPEDO STEERING CONTROL

Horace E. Karig, Pasadena, Calif., assignor to the United States of America as represented by the Secretary of the Navy Application October 8, 1948, Serial No. 53,546

1 Claim. (Cl. 114—24)

This invention relates in general to torpedo steering, and is more particularly described as a fluid pressure controlling system having an intercepting blade moved by the outer steering gyro gimbal to operate the rudder, keeping the torpedo upon a predetermined course.

In using air, nitrogen, or other fluid under pressure jet means under reduced pressure are employed to directly actuate a cylinder and piston device closely connected to the rudder. This is to eliminate air relays and pneumatic servo-mechanism, and makes possible a very simple control system with close connected parts which require no long tubular or rod connections which are so objectionable in a torpedo.

An important object of the invention is to provide a direct fluid power connection for operating a torpedo steering rudder by means of a jet interceptor actuated by the outer gyro gimbal.

Another object of the invention is to provide jets and orifices for torpedo steering mounted 180° opposed to each other for supplying air pressure directly into the steering engine such that the force on the rudder is proportional to the deviation of a torpedo from its course.

A further object of the invention is to provide loading spring means in connection with the steering engine operated by opposed jet interceptors, for a proportional loading and to act as a control dampener.

Still a further object of the invention is to provide a jet and orifice device for torpedo steering in which the displacement of the rudder is proportional to the deviation of the torpedo from its course.

Other objects of the invention will appear in the specification and will be apparent from the accompanying drawings, in which—

Fig. 1 is a diagrammatic view of a steering control for torpedoes in accordance with this invention;

Fig. 2 is a detail section as taken on the line 2—2 of Fig. 1;

Fig. 3 is an enlarged sectional view of a set of jet and orifice openings and a fragment of a cut-off blade as shown in Fig. 1;

Fig. 4 is a diagrammatic view of a steering control in which the steering engine is spring loaded;

Fig. 5 is a diagrammatic view of a force proportional steering control with a jet and orifice device as taken on the line 5—5 of Fig. 6 and a mechanical feed-back connection from the steering engine; and Fig. 6 is a sectional elevation showing the cut-off disk of Fig. 5 between upper and lower blocks containing the jet and orifice passages.

Referring now more particularly to the drawings, a vertical steering rudder 10 has a fixed mounting 11 and an extending arm 12 engaged by a piston rod 13 connected to a piston 14 movable oppositely in a cylinder 15. In the cylinder and bearing against the piston at both sides are coil springs 17 which tend to center the piston therein and to prevent slight variations or movements of the rudder.

Connected to opposite ends of the cylinder 15 are pipes 18 and 19 which lead to fixed orifice blocks 20 and 21 respectively. Between and slightly spaced from the orifice blocks is a fixed jet block 22 having a through passage 23 therein centrally connected by a pipe 24 with any suitable source of high pressure fluid supply. At each end of the jet block is a discharge jet 25, closely set back from the perimeter of the disk 28, and in each block 20 is a corresponding receiving orifice 26. The jets and orifices are spaced close together so that there is high pressure recovery in the orifices.

The disk 28 is connected to an outer gimbal 30 of the steering gyro of the torpedo and has a cut-off blade represented as an upstanding semi-circular rim 31, carried by the perimeter of the disk and which is interposed between the jets 25 and orifices 26 close to the jets, the ends of the rim forming the cut-offs, and the outer edges 32 of these blade ends being beveled on the orifice side. The jets are diametrically opposite and the beveled edges 32 overlap them the same amount when the blade is in its central or neutral position. A greater proportionality of air pressure is obtained by the beveled edges, the minimum proportional range is provided by a straight or blunt vertical edge.

In operation, assuming the parts to be in their central or neutral position, a movement of the outer gimbal 30 which rotates the disk 28 relatively in a clockwise direction will move the cut-off blade over the right orifice to close it and to open the left one; this will cause fluid under pressure to pass from the high pressure supply through the left orifice and by pipe 19 to the aft side of the cylinder 15. This moves the piston 14 in the opposite direction and draws the rudder 10 upwardly to direct the torpedo to the right. Conversely, when the outer gimbal moves the disk 28 in a relatively counter-clockwise direction, the rudder is turned to divert the torpedo to the left. In each case the exhaust side of the cylinder 15 discharges through the pipe 19 or 18 and the opening of the corresponding orifice block 21 or 20, and the movement of the piston is opposed by one of the springs 17.

To determine proper rudder movement is somewhat confusing, and is probably best visualized by considering the gimbal and its attached cut-off blade as fixed in space by the gyro and always directed towards the target. Any torpedo deviation results in movement of the orifice and jet blocks in such a way that if the torpedo veers to the right of its course, the left orifice (Fig. 1) is closed and the right orifice is opened. Under this condition the rudder must be moved to the left (or downwardly) to bring the torpedo back on its course.

In the form shown by Fig. 4 a disk 40 having a semicircular rim 41 forming a cut-off blade is mounted on a shaft 42 of the outer steering gyro and is rotated relatively to diametrically opposite jets 43 and 44 and orifices 45 and 46 therefor. The jets are in a block 47 having a passage 48 therein joining them and connected to a pipe 50 extending to a source of high pressure fluid supply. The orifices 45 and 46 are connected by pipes 51 and 52 with the opposite ends of an engine cylinder 53. In the cylinder is a piston 54 having a piston rod 55 extending from one end of the cylinder. On the outer end of the rod is a block 56 with a link 57 pivoted at one end thereto. The other end of the link is piovted to an arm 58 extending laterally from a rudder 60.

In the edge of the block 56 is a recess for receiving the free ends of flat springs 61, the other ends of which are secured by fastening bolts 62 to a support 63 for the jet and orifice block 47, preferably attached to a gyro steering pot having a rotatable top plate 64 with a peripheral gear 65 engaged by an angle setting pinion 66. These springs tend to hold the piston 54 normally in a central position in the cylinder and they resiliently oppose any movement of the block 56, the piston and cylinder, and the rudder 60, from that position. Thus the movement of the rudder is proportional to the force of the incident signal.

In the form shown by Figs. 5 and 6, a rudder 71 having an operating arm 70 is pivoted to a piston rod 72 extending from a cylinder 73 and connected to a piston 74 in the cylinder. Pipes 76 and 77 are connected to opposite ends of the cylinder for conducting pressure thereto for operating the piston and the rudder in either direction.

For controlling the pressure, a cut-off disk 78 connected by a shaft 79 with the outer gimbal of the steering gyro, is mounted between a high-pressure block 80 (Fig. 6) having opposite jets 81 and 82, and a low pressure block 83 having opposite receiving orifices 85 and 86. The jets are connected by passages 87 in the block 80 and high pressure is supplied by a pipe 88 extending from the block. The low pressure block has passages 91 and 92 extending from the orifices and connected to pipes 76 and 77 respectively.

In this form the cut-off disk is flat with opposite diametric or radial cut-off shoulders 93 and 94, and the jets and orifices are at right angles to the adjacent faces of the blocks 80 and 83. The high and low pressure blocks may have a feed-back connection comprising a lever 99 having an intermediate fixed pivot 95, with a pivot 96 at one end connected to the edges of the blocks 80 and 83 and extending radially therefrom, and at the other end pivoted to one end of a link 97, the other end of which is pivoted to a piston rod 98 extending through the end of the cylinder opposite to the piston rod 72.

This feedback arrangement provides a displacement of the rudder proportional to the angular deviation of the torpedo from its course. The action is effected by having the feedback link 97 reset null or neutral position of the jet and orifice blocks, 80 and 83, to follow the position of the disk 78. This resetting action takes place only after the piston has moved (or as it is moving) to a new location proportional to the relative position of the cut-off disk 78 with respect to the torpedo.

With this construction the relative movement of the gimbal which causes a clockwise turning of the disk 78 and representing a left or port movement of the torpedo, moves the shoulder 94 between the jet 82 and its orifice 86 and opens the orifice 85 to receive pressure from its jet 81. This causes pressure to be applied through pipe 76 to the aft end of cylinder 73 forcing the piston forwardly and moving the rudder 70 to the starboard side to guide the torpedo to that side correcting the port movement or variation. At the same time, the feed-back connection causes the blocks 80 and 83 to be rotated a relative amount in the counter clockwise direction, the same direction as the disk 78, thereby moving the block 83 and block 80 and the orifice 85 and jet 81 toward the cut-off shoulder 93 of the disk 78, so that the high pressure from the jet 81 will be cut off gradually as the low pressure block is turned equalizing the pressure upon the opposite sides of the piston. This allows the springs to center the piston in the cylinder 73 and to return the low pressure block 83 to its central or neutral position as soon as the positioning of the rudder returns the torpedo to its normal course and the cut-off disk 78 to an equalizing position partly covering each jet, thus helping to return the rudder to neutral position before a complete reversal of air pressure from the control elements.

In each of these forms a very slight movement of the outer gimbal, and consequently of the cut-off disk, is sufficient to set in motion and to operate the fluid pressure engine and to turn the rudder in a direction to correct the steering of the torpedo. When the correction is made, the control tends to return to and to maintain a central position. The spring loading prevents fluttery or frequent small variations of the rudder due to water forces. The loading springs also produce a more nearly force proportional operation in which the amount the rudder is turned depends to a great extent upon the intensity of the signal or the amount of deviation from the intended course which is evidenced by the outer gimbal variation.

Although described in its application to torpedoes, similar controls may be applied to other ships and also to aircraft. These forms should be regarded as illustrations or examples and not as limitations or restrictions, as various changes in the construction, combination, and arrangement of the parts may be made without departing from the spirit and scope of the invention.

I claim:

In a steering control for torpedoes and the like, in combination with the outer gimbal of a steering gyro in said torpedo, a disk attached to and turnable with the gyro gimbal, a jet block closely overlying the outermost unencumbered plane surface of the disk, said block crossing the axis of the disk, being fixed in reference thereto and having a through passage with a discharge jet in each of its oppositely directed ends at places closely set back from the perimeter of the disk, pressure fluid inlet means connected to the block centrally of the passage for equal distribution of fluid to the jets, orifice blocks fixed immediately beyond the perimeter of the disk, the orifice blocks confronting the jet block ends, being spaced closely therefrom and having orifices which are the targets of the respective discharge jets, a pressure fluid cylinder having its opposite ends connected with the orifices for pressure and exhaust, a piston in the cylinder and a rod extending therefrom out of one end of the cylinder, a rudder connected directly to the piston rod for movements in accordance with the piston movements, a rim carried by the perimeter of the disk, in upstanding relationship to the disk for riding in the space between the jets and orifices and having cutoff edges perpendicular to the disk and beveled so that the resulting sharp edges come next to the jets for impinging on and cutting the issuing pressure fluid close to its point of emergence as the disk responds to gimbal turning.

References Cited in the file of this patent

UNITED STATES PATENTS

| 1,418,792 | Hammond, Jr. | June 6, 1922 |
| 2,104,627 | Manteuffel | Jan. 4, 1938 |
| 2,498,285 | Leonard | Feb. 21, 1950 |

FOREIGN PATENTS

| 293,790 | Great Britain | Oct. 18, 1928 |